Figure 1:
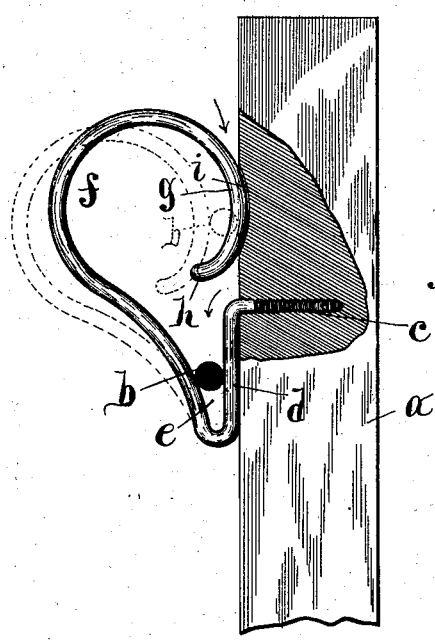

No. 724,713. PATENTED APR. 7, 1903.
F. G. KIMMAN.
CLOTHES LINE PROP ATTACHMENT.
APPLICATION FILED AUG. 7, 1902.

NO MODEL.

WITNESSES:
J. J. Laas.
G. Van Vorst

INVENTOR:
Frederick G. Kimman
By E. Laas
ATTORNEY.

UNITED STATES PATENT OFFICE.

FREDERICK G. KIMMAN, OF SYRACUSE, NEW YORK.

CLOTHES-LINE-PROP ATTACHMENT.

SPECIFICATION forming part of Letters Patent No. 724,713, dated April 7, 1903.

Application filed August 7, 1902. Serial No. 118,691. (No model.)

*To all whom it may concern:*

Be it known that I, FREDERICK G. KIMMAN, a citizen of the United States, and a resident of Syracuse, in the county of Onondaga, in the State of New York, have invented new and useful Improvements in Clothes-Line-Prop Attachments, of which the following, taken in connection with the accompanying drawings, is a full, clear, and exact description.
The object of this invention is to provide a simple, inexpensive, and convenient device for securely supporting the clothes-line on a pole or prop, and which device shall be readily attached to the prop at any desired point in the height thereof and readily and securely connected to the clothes-line and shall also permit the prop to be shifted lengthwise of the clothes-line as may be desired without danger of disconnecting the supporting device from the clothes-line; and to that end the invention consists in the novel construction of the clothes-line-prop attachment hereinafter described and as shown in the annexed drawings, in which—
Figure 1 is a side view of a portion of a clothes-line prop equipped with my invention, and Fig. 2 is a front view of said portion of the prop prepared to receive the aforesaid attachment.
$a$ denotes the pole or prop, designed to support the clothes-line $b$.

My invention resides in the device for securing the line to any suitable prop or pole at any portion of the length thereof, which device I form of a single piece of spring-steel wire, preferably galvanized to protect it from corrosion. One end portion of this wire is straight and screw-threaded to form the attaching-shank $c$, by which it is screwed into the side of the prop $a$ at any desired point in the height thereof. The remainder of said wire is first bent downward at a right angle from the shank $c$, as shown at $d$, so as to cause said portion to bear directly on the side of the prop, and thus brace the attaching device, as shown in Fig. 1 of the drawings. The remainder of the wire is then bent upward and slightly divergent from the downwardly-bent portion to form the jaw $e$ for gripping the clothes-line $b$. Then the wire is curved farther forward, upward, and rearward to form an approximately circular loop $f$, extending above the shank $c$ and passing with its downwardly-curved end portion through a line extending vertically from the first downwardly-bent portion $d$, as shown at $g$ in Fig. 1 of the drawings. Said loop $f$ is preferably terminated with a short forwardly-projecting portion $h$ at a short distance above the shank $c$. When said device is attached to the prop, as hereinbefore stated, the downwardly-bent portion $d$ bears on the side of the prop and effectually braces the device. At the same time the downwardly-curved end portion $g$ of the loop $f$ is caused to bear on the aforesaid side of the prop and effectually prevents accidental disconnection of the prop from the clothes-line. To prevent the said device from turning on the prop when secured to it as aforesaid, I provide the side of said prop with a notch or recess $i$, through which the downwardly-curved end portion $g$ of the loop $f$ passes.

Figure 2:
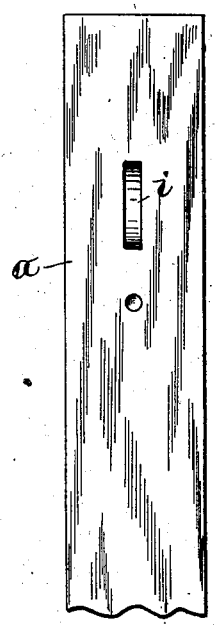

The prop $a$ is applied to the clothes-line $b$ by placing the upper end portion of the prop in a position to cause said portion of the prop to lie with its side on the clothes-line and then pushing the prop up and forcing the clothes-line down between the prop and end portion $g$ of the loop, which loop yields laterally to the pressure of the clothes-line, as represented by dotted lines in Fig. 1 of the drawings. The loop subsequently springs back into its engagement with the prop and closes the entrance for the clothes-line between the side of the prop and the portion $g$ of the loop, as shown in full lines in Fig. 1 of the drawings. Then by erecting the prop the clothes-line is caused to enter into the jaw $e$ and becomes gripped therein. In this operation the jaw is braced by its bearing against the face of the prop.

When it is desired to shift the prop lengthwise of the clothes-line, the prop is to be placed in an inclined position sufficiently to cause the clothes-line to be drawn out of the jaw $e$ and enter into the loop $f$, which is sufficiently large in diameter to allow knots in the clothes-line to pass through it.

It will be observed that the described retention of the prop on the clothes-line renders said prop always conveniently accessible for supporting the clothes-line and obviates the liability of the prop dropping to the ground and becoming soiled.

What I claim as my invention is—

1. The combination of a clothes-line-prop attachment consisting of a wire formed at one end with a screw-threaded shank and having its remaining portion formed into a downwardly-extending jar and with a loop extending upward from said jar and beyond a line passing back of the aforesaid jaw, and the prop provided with a recess receiving through it a portion of said loop to prevent the attachment from turning and to close the passage for the clothes-line to and from said attachment as set forth.

2. The improved clothes-line-prop attachment consisting of a wire having one end portion straight and screw-threaded to form the attaching-shank entering into the side of the prop, and the remainder of said wire bent first down at a right angle to said shank to bear on the aforesaid side, thence upward and terminated in the shape of a loop-bearing with a portion thereof on the side of the prop to completely close the passage for the clothes-line from the said loop as set forth and shown.

FREDERICK G. KIMMAN. [L. S.]

Witnesses:
J. J. LAASS,
G. VAN VORST.